(12) United States Patent
Camlica

(10) Patent No.: US 12,325,508 B2
(45) Date of Patent: Jun. 10, 2025

(54) CONTROL SURFACE SYSTEM

(71) Applicant: TUSAS- TURK HAVACILIK VE UZAY SANAYII ANONIM SIRKETI, Ankara (TR)

(72) Inventor: Fahri Bugra Camlica, Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 201 days.

(21) Appl. No.: 18/015,762

(22) PCT Filed: Apr. 26, 2021

(86) PCT No.: PCT/TR2021/050384
§ 371 (c)(1),
(2) Date: Jan. 12, 2023

(87) PCT Pub. No.: WO2022/019857
PCT Pub. Date: Jan. 27, 2022

(65) Prior Publication Data
US 2023/0219683 A1    Jul. 13, 2023

(51) Int. Cl.
*B64C 13/50* (2006.01)
*B64C 9/02* (2006.01)
*B64C 13/00* (2006.01)

(52) U.S. Cl.
CPC .............. *B64C 13/50* (2013.01); *B64C 9/02* (2013.01)

(58) Field of Classification Search
CPC .. B64C 9/18; B64C 13/50; B64C 9/06; B64C 9/20
See application file for complete search history.

(56) References Cited

U.S. PATENT DOCUMENTS

| | | | |
|---|---|---|---|
| 4,514,143 A * | 4/1985 | Campbell | B64C 27/001 416/500 |
| 5,224,826 A * | 7/1993 | Hall | B64C 27/46 416/4 |

(Continued)

FOREIGN PATENT DOCUMENTS

| CN | 109533279 A | 3/2019 |
|---|---|---|
| EP | 2053670 A1 | 4/2009 |

(Continued)

OTHER PUBLICATIONS

International Search Report and Written Opinion for PCT application No. PCT/TR2021/050384, mailed Jul. 14, 2021.

(Continued)

Primary Examiner — Brian M O'Hara
(74) Attorney, Agent, or Firm — Notaro, Michalos & Zaccaria P.C

(57) ABSTRACT

A control surface system is disclosed having at least one body provided on an air vehicle; at least one wing flap for controlling air flow by moving relative to the body located thereon and thus allowing the air vehicle to maneuver; at least one actuator made of an electro-active polymer material located between the body and the wing flap, wherein the actuator changes shape depending on electrical energy and thus triggering the wing flap; at least one holder located on the actuator and attached to the actuator from at least a part; at least one housing on which the holder is removably attached and which can moves together with the holder by way of the action of the actuator.

9 Claims, 3 Drawing Sheets

(56) References Cited

U.S. PATENT DOCUMENTS

| | | | | |
|---|---|---|---|---|
| 5,752,672 | A * | 5/1998 | McKillip, Jr. | B64C 27/001 244/99.8 |
| 6,168,379 | B1 * | 1/2001 | Bauer | B64C 27/615 244/90 R |
| 6,644,919 | B2 * | 11/2003 | Bauer | B64C 27/615 416/23 |
| 7,007,897 | B2 * | 3/2006 | Wingett | B64C 13/50 244/76 A |
| 7,338,017 | B2 * | 3/2008 | Pitt | B64C 13/00 244/99.8 |
| 10,518,871 | B2 * | 12/2019 | Robillard | B64C 9/06 |
| 11,745,852 | B2 * | 9/2023 | Henke | B64C 1/26 244/213 |
| 2020/0350803 | A1 * | 11/2020 | Morisaki | H02K 7/06 |

FOREIGN PATENT DOCUMENTS

| | | | |
|---|---|---|---|
| EP | 2233735 | A2 | 9/2010 |
| EP | 2770200 | A2 | 8/2014 |
| EP | 3444183 | A1 | 2/2019 |
| WO | 2007145718 | A2 | 12/2007 |
| WO | 2010151230 | A2 | 12/2010 |
| WO | 2019189342 | A1 | 10/2019 |

OTHER PUBLICATIONS

International Preliminary Report on Patentability, completed Nov. 25, 2022.
Demand/Request for Preliminary Examination dated May 20, 2022.
International Application Status Report generated Dec. 28, 2022.
Written Opinion of International Preliminary Examining Authority mailed Jul. 26, 2022.
Response to Written Opinion of International Preliminary Examining Authority dated Sep. 26, 2022.

* cited by examiner

CONTROL SURFACE SYSTEM

The present invention relates to a control surface system located in air and/or space vehicles and providing movements of the air vehicle.

Air and/or space vehicles comprise movable attachments in the body parts for providing movements of the air vehicle such as landing, take-off, turning or displacement during flight. Currently, complicated systems are used in the assembly of these parts to the body, and in movement mechanisms. The control surface system increases the expenses in terms of labour, time and cost when it is required to be assembled or disassembled (when it fails or needs repair).

The Chinese patent document CN109533279A, which is included in the known-state of the art, discloses moving the dielectric elastomer film material provided in the body and components of the air vehicles, and stretching the dielectric elastomer material with a coaxial stretching device.

The German patent document EP2053670, which is included in the known-state of the art, discloses that the prestress required for the movement of the dielectric elastomer film material used in the body and components of the air vehicles is provided by using mechanical springs or structures which are capable of functioning as a spring mechanism and storing elastic energy.

Thanks to a control surface system according to the present invention, maintenance and repair processes are completed in a shorter time.

Another object of the present invention is to reduce labour costs during maintenance and repair processes.

Another object of the present invention is to provide weight advantage of the air vehicle.

Another object of the present invention is to provide a faster, reliable and lighter surface control system.

The surface control system realized for achieve the object of the invention and defined in the first claim and the claims dependent thereon comprises a body which is provided in air vehicles and allows the air vehicle to stand on air; at least one wing flap positioned on the body, capable of moving towards and away from the body from a part thereof, and allows the air vehicle to manoeuvre and direct the air flow; at least one actuator which is elastomeric, made of an electro-active material and provides the movement of the wing flap by converting electrical energy received from an electrical power source into mechanical work for the wing flap to reach the position determined by a the user; a holder which holds the actuator by holding on to the actuator from a part thereof; a housing clamping into the holder to move in a single piece with the holder, wherein the housing allows the actuator to be removed and attached in a modular manner as the actuator is detached from the housing by removing the holder from the housing, wherein the housing is provided opposite to the housing located on the wing flap such that they are facing each other.

The control surface system of the invention comprises a housing which allows length and/or tension of the actuator to be changed by switching to different positions, and allows the actuator to have a tension determined by the user.

In an embodiment of the invention, the control surface system comprises housings each of which can be positioned independently from each other such that they face each other.

In an embodiment of the invention, the control surface system comprises a housing located on the body and/or the wing flap and moving between the positions predetermined by the manufacturer, in which the actuators operate effectively, so as to allow the opposite edges of the actuator on which the holders are located to be kept at a certain distance.

In an embodiment of the invention, the surface control system comprises a protrusion in the form of a rod located on the housing; at least one groove located on the body and/or wing flap and allows the actuator tension to be changed after the housing changes position by passing through the protrusion.

In another embodiment of the invention, the surface control system comprises at least one opening in the form of a hole, ring or recess located on the protrusion; at least one tension rod in the form of a shaft which fixes the position of the housing by means of openings on two opposing protrusions that pass on or through the opening so as to provide the housing into a position determined by the user.

In another embodiment of the invention, the surface control system comprises at least one electrically powered motor which is located at the air vehicle and allows position of the housing through which the holder can pass to be changed forward-backward, upward-downward, angularly or as a combination thereof during flight; and at least one control unit which controls operating range and timing of the motor and allows the housing to be brought into the position determined by the user so that the actuator is used tensely.

In a further embodiment of the invention, the control surface system comprises at least one wing flap which is located on the air vehicle and directs the air during take-off/landing and/or during flight.

In an embodiment of the invention, the control surface system comprises at least one energy storage element which allows adjustment of the compression and/or tension applied on the actuator by connecting from one end to the body or wing flap and from the other end to the actuator, holder or housing.

Continuous tension is provided by at least one energy storage element located on opposite sides of the actuator in the form of housing, holder and/or film.

In another embodiment of the invention, the control surface system comprises at least one gear rotating around its own axis by means of at least one electric motor; at least one rack and pinion gear in a linear form, which converts rotational movement of the gear into linear movement and has gear slots; a housing which is in contact with the rack and pinion gear from at least a part, and changes position in the forward-backward direction by the linear movement of the rack and pinion gear.

In another embodiment of the invention, the control surface system comprises an actuator containing silicon/graphite, carbon conductive grease, carbon-based or silver grease, which allows electrical conductivity thereof to be increased and/or can be deformed while maintaining its conductivity.

In another embodiment of the invention, the control surface system comprises a T-, L- and/or C-shaped housing; and a holder which is movable by being fixed by means of the shape matching with the housing.

The control surface system realized for achieving the object of the present invention is illustrated in the attached drawings, in which.

Figure 1:
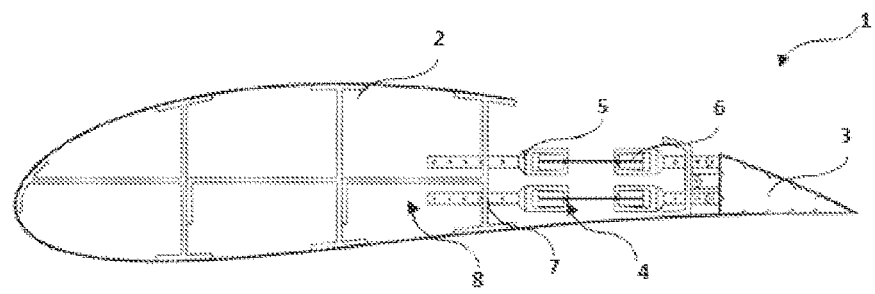
FIG. 1 is a sectional view of a surface control system.

All the parts illustrated in figures are individually assigned a reference numeral and the corresponding terms of these numbers are listed below:
1. Control surface system
2. Body
3. Flap
4. Actuator
5. Holder
6. Housing
7. Protrusion
8. Groove
9. Opening
10. Tension Rod
11. Motor
12. Control Unit
13. Energy Storage Element
14. Gear
15. Rack and Pinion Gear The control surface system (1) comprises at least one body (2) provided in air vehicles; at least one wing flap (3) which provides the air flow to be controlled by moving relative to the body (2) located thereon, thus allows the air vehicle to manoeuvre; at least one actuator (4) made of an electro-active polymer material, located between the body (2) and the wing flap (3), wherein the actuator (4) changes shape depending on electrical energy, thus triggering the wing flap (3); at least one holder (5) located on the actuator (4) and attached to the actuator (4) from at least a part; at least one housing (6) on which the holder (5) is removably attached, and which can move together with the holder (5) by means of the movement of the actuator (4) (FIG. 1).

The control surface system (1) of the invention comprises a housing (6) which can be brought to a position determined by the user, thus allows the actuator (4) to be used within a desired length and/or tension range (FIG. 1).

The control surface system (1) comprises at least one body (2) provided in air vehicles, which is a vertical stabilizer, a horizontal stabilizer or an airframe; at least one wing flap (3) located on the body (2) and allows moving relative to the body (2) from at least a part thereof, thus allows the air that flows from the body of the air vehicle to be directed so that the air vehicle can manoeuvre, wherein the wing flap (3) can be used as rudder, spar, flap, aileron or elevator; at least one actuator (4) made of electro-active material, which allows the wing flap (3) to move relative to the body (2) by lengthening and shortening as a result of the electrical stress applied thereon; at least one holder (5) located on the wing flap (3) by holding on to the actuator (4) from at least a part; at least one housing (6) located on the body (2) and/or the wing flap (3), being capable of moving together with the holder (5) by clamping thereto by means of the shape matching with the holder (5), and allows the actuator (4) to be detached or attached via the holder. Thus, there are actuators (4) in the form of a strip film made of electro-active material with dielectric elastomer property, which allow the moving parts functioning as the wing flap (3) located on the air vehicle body (2) to move. The system comprises a holder (5), which allows the actuators (4) to be attached and removed from the body (2) and/or the wing flap (3) by holding on to the actuator (4); a housing (6) provided on the body (2) and/or the wing flap (3), in which the holder (5) is modular (FIG. 1).

The control surface system (1) comprises a housing (6) which allows length and/or tension of the actuator (4) to be changed by changing the position of the housing (6). Thus, there will be an increase in the operating performance of the actuator (4) in the form of a film, which has dielectric elastomer feature (FIG. 1).

In an embodiment of the invention, the control surface system (1) comprises housings (6), each of which can be positioned independently from each other such that they face each other. Thus, tension control is provided by pulling the actuator (4) from different parts (FIG. 1).

In an embodiment of the invention, the control surface system (1) comprises a housing (6) which allows a certain distance to be provided between the holders (5) by moving between the positions determined by the user. Thus, the housing (6) will be in in different positions (FIG. 1).

In an embodiment of the invention, the control surface system (1) comprises at least one protrusion (7) located on the housing (6); at least one groove (8) which is located on the body (2) and/or the wing flap (3), wherein the groove (8) allows the tension of the actuator (4) to be changed as a result of the housing (6) changing position by moving over the protrusion (7). Thus, the housing (6) moving by means of the protrusion is provided to be fixed in different positions (FIG. 1).

Figure 2:
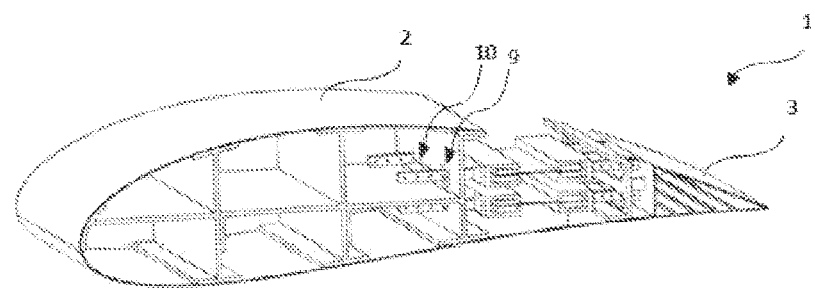
FIG. 2 is a perspective view of a control surface system.

In an embodiment of the invention, the control surface system (1) comprises at least one opening (9) which is located on the protrusion (7); at least one tension rod (10) capable of passing through the opening (9) and thus, allows the housing (6) to remain in the position determined by the user and/or allows a gradual change in the position of the housing (6). Thanks to the plurality of grooves (8) located on the protrusion (7), position of the housing (6) is determined by means of a controller which controls the tension rod (10) and/or by an operator. Thus, the tension of the actuator (4) can be controlled continuously (FIG. 2).

Figure 3:
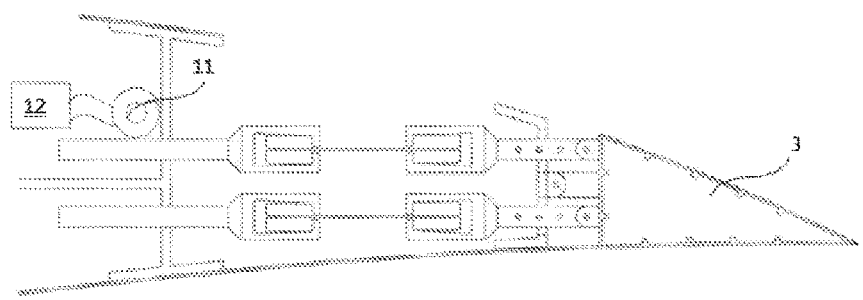
FIG. 3 is a partial section view of a control surface system.

In an embodiment of the invention, the control surface system (1) comprises at least one motor (11) which allows the position of the housing (6) to be changed by triggering the housing (6); and at least one control unit (12) which controls the operation of the motor (11). Thus, it is provided that the actuators (4) acting on the movement of the wing flaps (3) in the air vehicle operate efficiently by controlling the tension thereof in an active and continuous manner, and the control unit (12) compares data and flight algorithms received from detectors and sensors in the air vehicle such that the actuator (4) operates in a desired range (FIG. 3).

In an embodiment of the invention, the control surface system (1) comprises a wing flap (3) which is a vertical stabilizer, horizontal stabilizer, rudder, spoiler or flap on the airframe. The take-off, flight and landing activities of the air vehicle are carried out by the moving parts located on the body (2), such as flaps or the like (FIG. 3).

Figure 4:
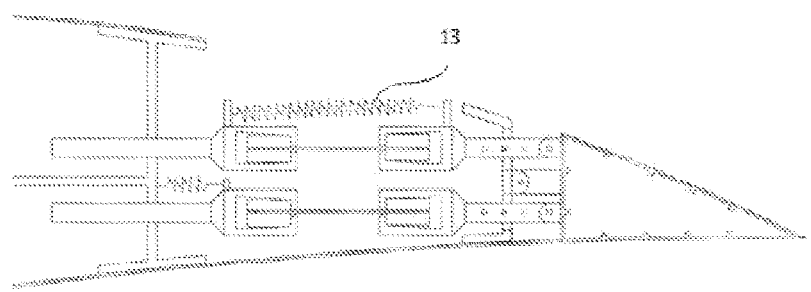
FIG. 4 is a partial section view of a control surface system.

In an embodiment of the invention, the control surface system (1) comprises at least one energy storage element (13) which allows the compression and/or tension applied on the actuator (4) to be adjusted by connecting at one end to the body (2) or wing flap (3) and at the other end to the actuator (4), holder (5) or housing (6). Continuous tension is provided by at least one energy storage element (13) located on opposite sides of the actuator (4) in the form of (6) housing, holder (5) and/or film (FIG. 4).

Figure 5:
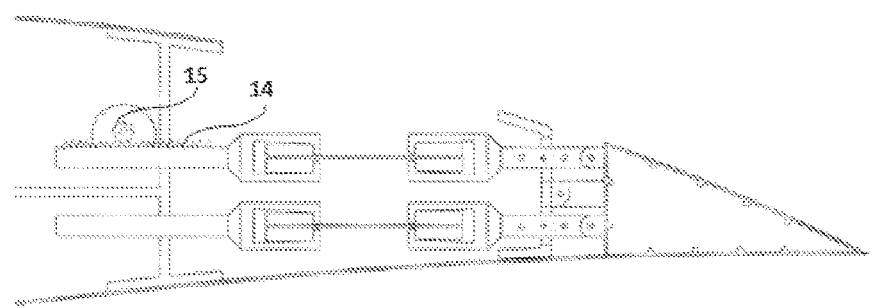
FIG. 5 is a partial section view of a control surface system.

In an embodiment of the invention, the control surface system (1) comprises at least one gear (14) rotating around its own axis by means of at least one electric motor; at least one rack and pinion gear (15) which converts rotational movement of the gear (14) into linear movement; a housing (6) which is in contact with the rack and pinion gear (15) from at least a part thereof, and changes position by the linear movement of the rack and pinion gear (15). Thus, it is provided maintaining of position control of the housing (6) by the movement of the rack and pinion gear (15) (FIG. 5).

In an embodiment of the invention, the control surface system (1) comprises an actuator (4) containing silicon/graphite, carbon conductive grease, carbon-based or silver grease, which allows electrical conductivity thereof to be increased and/or can be deformed while maintaining its electrical conductivity. Thus, it is provided maintaining conductivity of the actuator (4) in different lengths.

In an embodiment of the invention, the control surface system (1) comprises a C-shaped housing (6); and a holder (5) which can move by clamping with the housing (6) by means of their matching shapes. The actuator becomes removable by means of the holder (5) and the housing (6), which have matching geometries.

The invention claimed is:
1. A control surface system (1) comprising:
 a wing (2) provided for an air vehicle;
 a wing flap (3) located on the wing (2) which moves relative to the wing (2);
 an actuator (4) located between the wing (2) and the wing flap (3), wherein the actuator (4) is made of an electroactive polymer material and changes shape depending on electrical energy, thus triggering the wing flap (3);
 a holder (5) located on the actuator (4) and attached to the actuator (4) from at least a part;
 a housing (6) on which the holder (5) is removably attached, and which can move together with the holder (5) by means of the movement of the actuator (4), wherein housing (6) can be brought to a position input by a user so that the actuator (4) is adjusted;
 a protrusion (7) located on the housing (6);
 a groove (8) which is located on the wing (2) and/or wing flap (3), wherein the groove (8) allows the tension of the actuator (4) to be changed as a result of the housing (6) changing position by moving over the protrusion (7); and
 an opening (9) which is located on the protrusion (7);
 a tension rod (10) configured to pass through the opening (9) to allow the housing (6) to remain in a position determined by the user and/or allow a gradual change in a position of the housing (6); and
 wherein the housing (6) is C-shaped, and wherein the holder (5) has a matching shape to the housing (6) so that the actuator is coupled to positioned between the housing (6) and the holder (5).

2. A control surface system (1) according to claim 1, comprising a plurality of the housings (6) and wherein each of the housings (6) can be positioned independently from each other such that they face each other.

3. A control surface system (1) according to claim 1 comprising a plurality of holders (5) and wherein the housing (6) allows a certain distance to be provided between the holders (5) by moving between positions input by the user.

4. A control surface system (1) according to claim 1, comprising: at least one motor (11) for the air vehicle that allows the position of the housing (6) to be changed by triggering the housing (6); and
 at least one control unit (12) which controls the operation of the motor (11).

5. A control surface system (1) according to claim 1, wherein the wing flap (3) is a vertical stabilizer, horizontal stabilizer, rudder, spoiler or flap on the air vehicle.

6. A control surface system (1) according to claim 1, comprising, at least one energy storage element (13) for adjusting the compression and/or tension applied on the actuator (4) by connecting at one end to the wing (2) or wing flap (3) and at the other end to the wind flap or the housing/holder on the wing flap side.

7. A control surface system (1) according to claim 1, comprising:
 at least one gear (14) rotating around its own axis by means of at least one electric motor;
 at least one rack and pinion gear (15) which converts rotational movement of the gear (14) into linear movement; and
 wherein the housing (6) is in contact with the rack and pinion gear (15) from at least a part thereof and changes position by the linear movement of the rack and pinion gear (15).

8. A control surface system (1) according to claim 1, wherein the actuator (4) containing silicon/graphite, carbon conductive grease, carbon-based or silver grease so that an electrical conductivity thereof is increased and/or the actuator (4) can be deformed while maintaining its electrical conductivity.

9. A control surface system (1) according to claim 1, wherein the holder (5) moves by clamping with the housing (6) by way of their matching shapes.

* * * * *